United States Patent [19]
Yamazaki et al.

[11] Patent Number: 5,561,643
[45] Date of Patent: Oct. 1, 1996

[54] TRACKING SYSTEM FOR USE IN REGULAR AND HIGH DENSITY OPTICAL RECORDING MEDIUMS

[75] Inventors: Koichi Yamazaki, Sakado; Eiichi Nakamura, Sagamihara; Hiroaki Yoshida, Hiki-gun, all of Japan

[73] Assignee: Nippon Conlux Co., Ltd., Tokyo, Japan

[21] Appl. No.: 301,662

[22] Filed: Sep. 7, 1994

[30] Foreign Application Priority Data

Sep. 10, 1993 [JP] Japan .................. 5-248469

[51] Int. Cl.$^6$ .................. G11B 11/00
[52] U.S. Cl. .................. 369/15; 369/44.37
[58] Field of Search .................. 369/15, 14, 44.37, 369/44.38, 32, 47, 44.32, 44.41, 109; 235/454

[56] References Cited

U.S. PATENT DOCUMENTS

| | | | |
|---|---|---|---|
| 4,243,850 | 1/1981 | Edwards | 369/44.37 |
| 4,831,609 | 5/1989 | Suzuki | 369/44.37 |
| 5,113,378 | 5/1992 | Kimura | 369/44.38 |
| 5,123,003 | 6/1992 | Noda et al. | 369/44.37 |
| 5,153,863 | 10/1992 | Noda et al. | 369/44.37 |
| 5,375,112 | 12/1994 | Togawa | 369/15 |

FOREIGN PATENT DOCUMENTS

| | | |
|---|---|---|
| 60-229244 | 11/1985 | Japan . |
| 4-38067 | 6/1992 | Japan . |
| 4-341935 | 11/1992 | Japan . |
| 4-330647 | 11/1992 | Japan . |
| 5-101407 | 4/1993 | Japan . |

*Primary Examiner*—Tan Dinh
*Attorney, Agent, or Firm*—Loeb & Loeb LLP

[57] ABSTRACT

A high-density recording medium has data tracks and guide tracks formed on both sides of each of the data tracks. Intervals between the guide tracks are set in such a manner that the outer edges of two adjacent guide tracks correspond in position to two tracking laser beam spots on the recording medium. To allow use of either of the high-density recording medium, and a conventional recording medium on which intervals between guide tracks are set in such a manner that the inner edges of two adjacent guide tracks correspond in position to two tracking laser beam spots, control is performed such that polarity of a tracking control servo is selectively inverted depending upon which of the high-density and conventional recording medium is used.

13 Claims, 4 Drawing Sheets

TRACKING SYSTEM FOR USE IN REGULAR AND HIGH DENSITY OPTICAL RECORDING MEDIUMS

BACKGROUND OF THE INVENTION

The present invention relates to an optical recording medium such as an optical card and an optical information recording/reproducing system for use with the optical recording medium. More particularly, the present invention relates to an optical recording medium on which high-density recording is advantageously achieved and also to a compatible, optical information recording/reproducing system which is applicable to both such a high-density optical recording medium and a conventional (less-density) optical recording medium.

Optical information recording/reproducing systems using an optical recording medium such as an optical card are popularly known today, and, in order for each of the recording/reproducing system to perform information recording on the optical recording medium, a plurality of optically detectable guide tracks are repetitively formed on the recording medium at predetermined intervals with a data track formed between every two adjacent guide tracks. Thus, the recording/reproducing system writes or reads information while accurately positioning a reading or writing optical beam at a desired data track on the basis of optical detection of the respective locations of the guide tracks (this technique is called "tracking"). Typical prior examples of the information recording and tracking techniques for such optical information recording/reproducing systems are disclosed in, for example, Japanese Patent Laid-open Publication Nos. SHO 60-229244, HEI 4-330647, HEI 4-341935 and HEI 5-101407 and Japanese Patent Publication No. HEI 4-38067.

Figure 4:
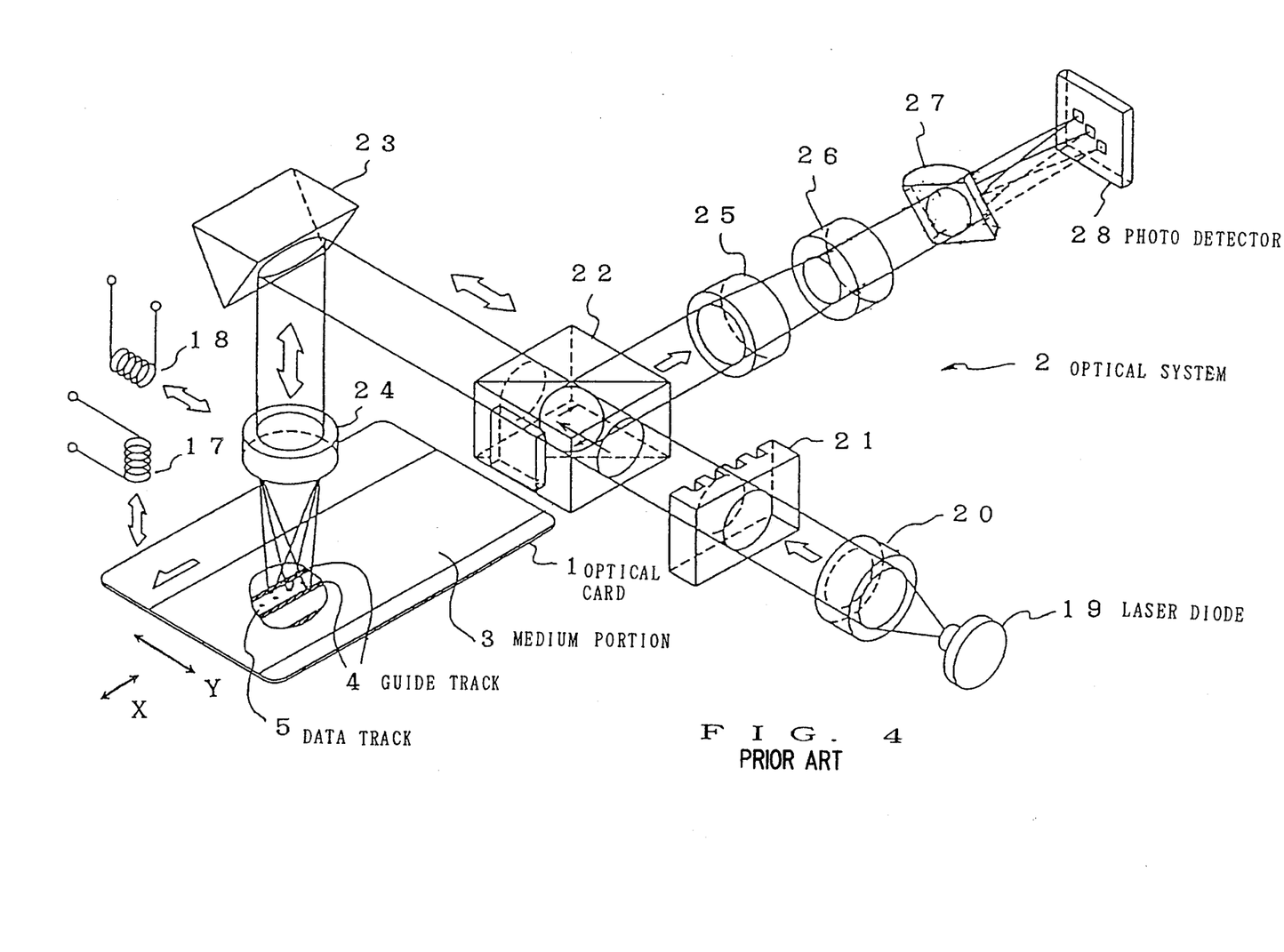
FIG. 4 is a schematic view showing an example of a conventional optical system employed in the optical information recording/reproducing system.

FIG. 4 shows an optical recording medium (optical card 1) and a read/write optical system 2 employed in a typical example of a conventionally known optical information recording/reproducing system. The prior art pertinent to the present invention will be described hereinafter with reference to this figure. The optical recording medium is an optical card 1 that is of course portable and removably attachable to the read/write optical system 2. The read/write optical system 2 is accommodated within a casing (not shown) of the recording/reproducing device. Upon insertion of the optical card 1 into a predetermined insertion slot (not shown) formed in the casing, the card 1 is automatically transferred in the X direction by means of a card transfer mechanism (not shown) until the card 1 reaches a predetermined position for read/write operation by the optical system 2.

The optical card 1 has a substrate formed of light-weight hard material such as plastics and a recording medium portion (data recording region) 3 provided on a predetermined surface area of the substrate. The recording medium section (data recording region) 3 has a plurality of guide tracks 4 that extend in the card transfer direction X and are spaced apart from each other at predetermined intervals. There is formed a data track 5 between every two adjacent guide tracks 4. The guide tracks 4 are formed to be optically detectable. Using photoprinting process, for example, each of the data tracks 5 is formed to provide a relatively high reflection factor, while each of the guide tracks 4 is formed to provide a relatively low reflection factor. On the data tracks 5, desired information can be recorded in the form of circular holes called "pits". As is well known, the pits are formed by irradiation of a properly-focused write laser beam, and readout of recorded data on each data track 5 is achieved by detecting that the reflection factor of the laser beam irradiated onto the data track 5 is decreased by the "pit" portions. The recording medium portion 3 is composed of a recording layer formed of predetermined material that is reactive to the write laser beam and a protecting layer that is provided over the recording layer in such a manner to allow transmission therethrough of the read/write laser beam onto the underlying recording layer.

The optical system 2 is integrated as an optical head unit and is movable in the Y direction (direction transverse to the tracks 4 and 5) by means of an optical head transfer mechanism (not shown). Further, for tracking purposes, the respective irradiated spots of the laser beams (laser beam spots) are finely adjustable. In general, the tracking operation is performed using a control method commonly known as a three-beam method, which is based on the arrangement that three laser beams spaced apart from each other are emitted from the optical system 2, with the middle one of the three laser beams being associated with the data track 5 as a read/write beam and the two laser beams on both sides of the middle beam being associated with the track guides 4 as tracking beams. More specifically, by measuring the magnitude of respective reflection of the two side laser beams, the irradiated spots of the laser beams are servo-controlled so that the tracking beams are accurately associated with the guide tracks 4 on both sides of the data track 5 in predetermined positional relation thereto and consequently the middle read/write beam spot is always accurately at a substantially middle position of the corresponding data track 5.

To further explain the optical system 2 with reference to FIG. 4, scattering light is emitted from a light source which is, in this example, in the form of a laser diode 1, and the scattering light is then collimated through a collimator lens 20 and further split into three beams via a diffraction grating 21. There is provided an angle adjusting mechanism (not shown) to allow the diffraction grating 21 to stably follow the optical card tracks. After the diffraction grating 21 is a beam splitter 22 for separating the beams into transmitted and reflected light components. After the beam splitter 22 is provided a reflector mirror 2 that serves to change the direction of the laser beams by 90° so as to achieve a compact size of the optical head unit (optical system 2). An objective lens 24 is further provided for converging and irradiating the individual laser beams onto the optical card 1. There are provided a vertical drive mechanism 17 for focusing the objective lens 24 and a tracking drive mechanism 18 for moving the objective lens 24 transversely (in the Y direction) for tracking purposes. Thus, focusing and tracking operations are performed as desired by biaxially driving the objective lens 24 by means of these mechanisms 17 and 18.

The three laser beams irradiated through the objective lens 24 onto the optical card 1 are reflected with variable reflection factors depending on the presence or non-presence of the pit and guide track 4 and pass through the objective lens 24, reflector mirror 23 and beam splitter 22 where they are respectively separated as reflected light components. The respective reflected light components then lead to a light receiving system. The light receiving system generally comprises a collimator lens 27, a convex lens 26, a cylindrical lens 27 and a photo detector assembly 28, so that the respective reflected light components of the three laser beams are received by the photo detector 28 which in turn provides electrical signals corresponding to the energy levels of the light components received.

Figure 5:
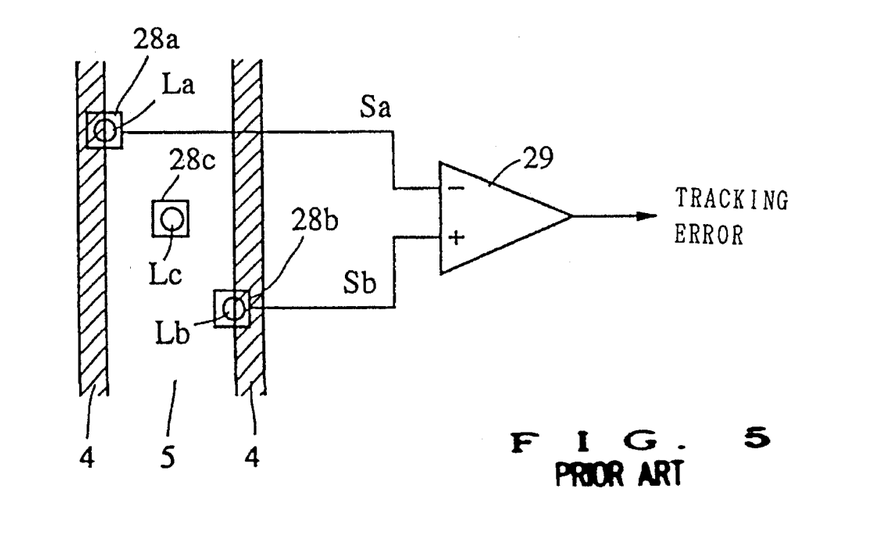
FIG. 5 is a conceptual diagram of a tracking error detecting circuit employed for the conventional type optical recording medium.

FIG. 5 shows an example of a tracking error detection circuit provided in the optical system. The photo detector 28 is composed of three photo detector elements 28a, 28b, 28c that are positioned at predetermined locations for detecting the corresponding reflected light components of the three laser beams: the side photo detectors 28a and 28b detect the reflected light of the two tracking laser beams, while the central photo detector 28c detects the reflected light component of the read/write laser beam. The tracking error detection circuit includes a differential amplifier 29, which receives at its "−" input one of the output signals of the tracking laser beam receiving photo detector elements 28a and 28b and receives at its "+" input the other of the output signals.

In FIG. 5, for ease of understanding, the two guide tracks 4 and intervening data track 5 and the three laser beam spots La, Lb, Lc are shown as overlapping the photo detectors 28a, 28b, 28c. The positional relationship between the laser beam spots La, Lb, Lc and the tracks 4, 5 is such that when, as shown, the middle read/write laser beam spot Lc is exactly in the middle of the data track 5, the inner edges of the guide tracks 4 on both sides of the data track 5 are positioned across the centers of the side tracking laser beam spots La and Lb, respectively. As may be readily understood, when the guide tracks 4 are displaced from the illustrated positions to the right relative to the laser beam spots La, Lb, Lc, the amount of the laser beam La applied onto the left guide track 4 increases, while the amount of the laser beam Lb applied onto the right guide track 4 decreases. In consequence, the light energy received by the left photo detector element 28a decreases, while the light energy received by the right photo detector element 28b increases. It should be apparent from the foregoing that when the guide tracks 4 are displaced from the illustrated positions to the left relative to the laser beams La, Lb, Lc, the opposite of the above-mentioned takes place.

If it is assumed that the tracking beam detection signals output from the photo detector elements 28a and 28b are Sa, Sb, the differential amplifier 29 calculates a difference "Sb−Sa". When, as shown in FIG. 5, the middle read/write laser beam Lc is located exactly in the middle of the data track 5 and the inner edges of the left and right guide tracks 4 are positioned across the centers of the left and right tracking laser beam spots La and Lb, respectively, the output signals Sa and Sb from the left and right photo detector elements 28a and 28b equal and thus the differential amplifier 29 provides a zero output. Once the guide tracks 4 are displaced from the illustrated positions to the right relative to the beam spots La and Lb, Sa<Sb and thus the output signal from the differential amplifier 29 takes a positive value corresponding to the displacement. Conversely, once the guide tracks 4 are displaced from the illustrated positions to the left relative to the beam spots La and Lb, Sa>Sb and thus the output signal from the differential amplifier 29 takes a negative value corresponding to the displacement. The positive or negative value output from the differential amplifier 29 is representative of a tracking error.

Accordingly, for tracking control, the tracking drive mechanism 18 is servo-controlled in the transverse direction (in the Y-direction of FIG. 4) in order to eliminate a tracking error, i.e., to make "0" the output from the differential amplifier 29. More specifically, if the output from the differential amplifier 29 is a positive value, the laser beam spots La, Lb, Lc are moved to the right by the amount corresponding to the positive value, and if the output from the differential amplifier 29 is a negative value, the laser beam spots La, Lb, Lc are moved to the left by the amount corresponding to the negative value.

With the optical information recording/reproducing system constructed in the above-mentioned manner, in order to increase the storage capacity of the optical recording medium without increasing the medium's physical size, i.e., in order to achieve high-density recording on the medium, it is sufficient to narrow the respective widths of and intervals between the tracks. In such a case, the degree to which the recording density can be increased depends upon the fabrication technique (track formation technique) employed for the optical recording medium, as well as upon the grating technique for forming the three laser beams separated at predetermined intervals.

However, the densification technique traditionally employed for optical recording media inevitably required not only narrowing of the widths and intervals of the tracks as mentioned above but also substantial structural alterations of the optical system so as to generate laser beams of suitable standard for the requirement. For these reasons, after the optical information recording/reproducing system was structurally standardized and various devices and components of the system were fixed to predetermined sizes, the recording medium to be used by the system could not easily be formed to high density. Namely, it is not sufficient to merely increase the recording density of the optical recording medium, because the optical system must itself be structurally altered. So, even if densification of the optical recording medium is at all possible from a technical point of view, there would be encountered the problem of high cost due to the required structural alterations of the optical system. In addition, because of the required structural alterations of the optical system, the prior art optical recording medium after being subjected to densification process becomes incompatible with the conventional systems and hence has reduced utility.

For example, to change the track intervals requires change in the intersecting angle θ of the row of the three laser beam spots with respect to the tracks; however, with the conventional optical systems, the grating must be adjusted to change the intersecting angle θ of the row of the three laser beam spots with respect to the tracks. In general, the grating adjustment is such an operation to bend, to a desired angle, a diffraction grating formed of rectangular thin flat glass when it is to be fixed to a housing made of plastics or sheet metal. This grating adjustment operation is performed relatively easily during manufacture of the device, but is very difficult to perform after the device is assembled within the optical head unit.

SUMMARY OF THE INVENTION

It is therefore an object of the present invention to provide an optical recording medium which can be easily densified in storage capacity without requiring any structural alterations of an information read/write optical system.

It is another object of the present invention to provide a compatible, optical information recording/reproducing system which is applicable to both such a high-density optical recording medium and a conventional (non-densified) optical recording medium.

It is still another object of the present invention to provide a tracking control device which is used to realize such a compatible, optical information recording/reproducing system.

The present invention provides an optical recording medium on which tracking and read/write of information are performed by irradiation thereonto of two tracking laser beams and a read/write laser beam positioned between the tracking laser beams, the optical recording medium comprising data tracks for optically recording thereon desired information and optically detectable guide tracks formed on both sides of each of the data tracks, each of the data tracks being formed between the guide tracks that are spaced apart from each other at predetermined intervals, the predetermined intervals being set in such a manner that outer edges of two adjacent guide tracks correspond in position to irradiated spots of the two tracking laser beams.

An optical information recording/reproducing system in accordance with the present invention is capable of selectively using either of optical recording media defined in items (a) and (b) below:

(a) a first-type optical recording medium comprising data tracks for optically recording thereon desired information and optically detectable guide tracks formed on both sides of each of the data tracks, each of the data tracks being formed between the guide tracks that are spaced apart from each other at first predetermined intervals, the first predetermined intervals being set in such a manner that inner edges of two adjacent guide tracks correspond in position to irradiated spots of the two tracking laser beams; and (b) a second-type optical recording medium comprising data tracks for optically recording thereon desired information and optically detectable guide tracks formed on both sides of each of the data tracks, each of the data tracks being formed between the guide tracks that are spaced apart from each other at second predetermined intervals, the second predetermined intervals being set in such a manner that outer edges of the guide tracks correspond in position to irradiated spots of the two tracking laser beams. Further, the recording/reproducing system comprises a tracking servo polarity changing section for, depending upon which of the first- and second-type optical recording media is used, changing a polarity of tracking servo that performs tracking control of the irradiated spots of the laser beams on the basis of detection signals of respective reflection of the tracking laser beams from the recording medium used.

Figure 1A:
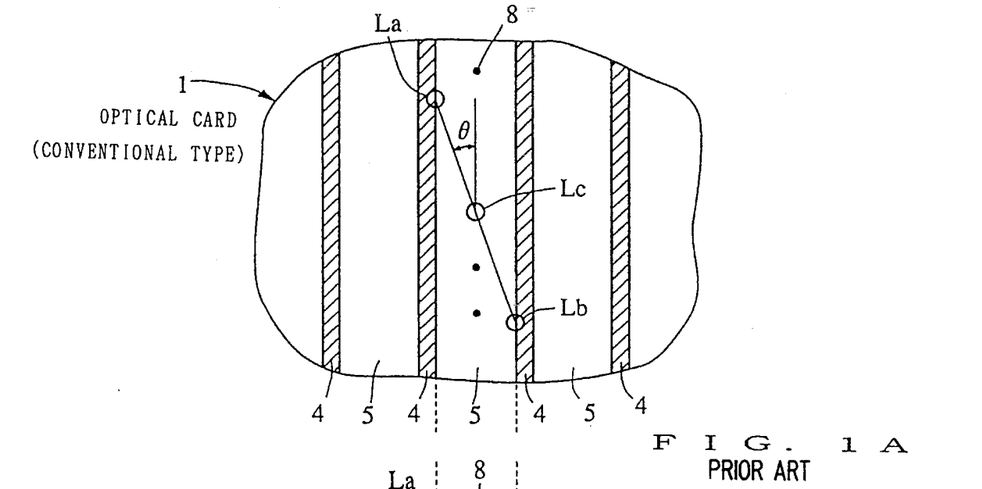
FIG. 1A is an enlarged fragmentary view of tracks provided on a conventional type optical recording medium in accordance with an embodiment of the present invention.
Figure 1B:
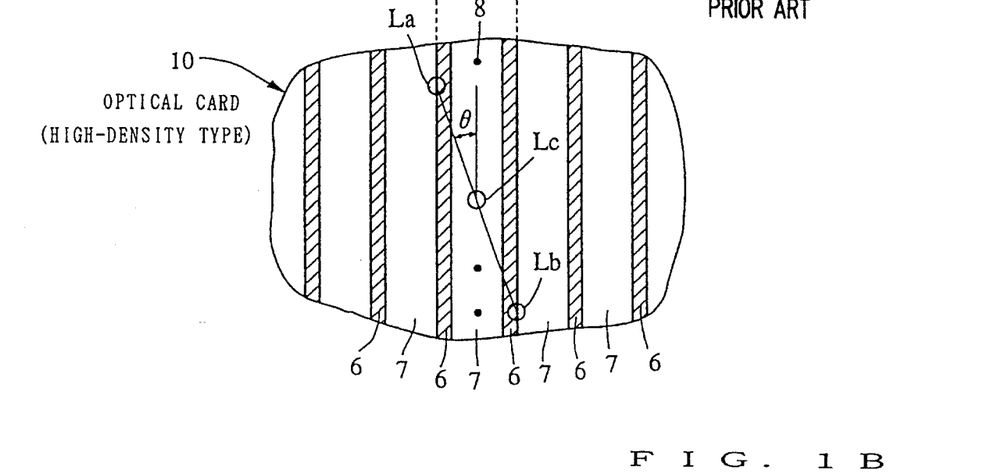
FIG. 1B is an enlarged fragmentary view of tracks provided on a high-density type optical recording medium in accordance with an embodiment of the present invention.

According to the optical recording medium of the present invention, intervals between the guide tracks are set in such a manner that the outer edges of two adjacent guide tracks correspond in position to two tracking laser beam spots respectively (refer to FIG. 1B). This allows the guide track intervals to be minimized with respect to the positional arrangement of the tracking laser beam spots, and thus it is possible to achieve desired densification of the optical recording medium. By contrast, the track arrangement of the conventional or less-density optical recording medium is generally as shown in FIG. 5, in which intervals between the guide tracks are set in such a manner that the inner edges of two adjacent guide tracks correspond in position to two tracking laser beam spots respectively. This indicates that the same positional arrangement of the tracking laser beam spots can be used compatibly for the two types of optical recording media.

Stated in another way, the optical information recording/reproducing system of the present invention is usable for both the first-type recording medium as defined in item (a) above (i.e., the conventional-type recording medium as shown in FIG. 5) and the second-type recording medium as defined in item (b) above (i.e., the high-density recording medium proposed by the present invention), and the system is characterized in that it permits compatible use of the two types of recording media by only newly adding the tracking servo polarity changing section without any alterations to the positional arrangement of the laser beams. The first-type recording medium and second-type recording medium present exactly opposite characteristics in terms of their output changes relative to the tracking laser beam spots at predetermined positions. Thus, completely compatible tracking control can be achieved without any alterations to the positional arrangement of the laser beams, by only adding the tracking servo polarity changing section for, depending on which of the first- and second-type recording media is used, changing the polarity of the tracking servo that performs tracking control of the irradiated spots of the laser beams on the basis of detection signals of reflected light components of the tracking laser beams.

Further, a tracking control device for an optical information recording/reproducing system in accordance with the present invention comprises an optical section for irradiating two tracking laser beams onto two guide tracks of a recording medium and receiving respective reflection of the tracking laser beams to provide corresponding electrical light detection signals, a servo control loop including a calculation section for calculating a difference between the light detection signals, the servo control loop, using an output from the calculation section as a feedback signal representative of a tracking error, servo-controlling the irradiated spots of the laser beams so that the irradiated spots are at predetermined positions with respect to the guide tracks, a polarity inversion section for inverting polarity of signals in the servo control loop, and a selection section for selecting, for use in the servo control loop, either signals inverted by the polarity inversion section or non-inverted signals.

According to the tracking control device, a polarity inversion section is provided in the tracking servo control loop so as to selectively use either of polarity-inverted signal and non-polarity-inverted signal. Namely, inversion control of the servo control polarity is permitted, and thus the two types of recording media can be advantageously used in the optical information recording/reproducing system by providing selective control in dependence upon which of the two types of recording media is applied.

Now, the preferred embodiment of the present invention will be described in detail below with reference to the accompanying drawings.

DETAILED DESCRIPTION OF THE PREFERRED EMBODIMENT

FIG. 1B shows an embodiment of an optical recording medium 10 in accordance with the present invention and more particularly shows the track arrangement of the recording medium 10 in an enlarged fragmentary view. The entire shape and material of the optical recording medium 10 may themselves be similar to those of a conventionally well-known optical card as shown in FIG. 4, which has a predetermined data recording region (recording medium portion) where plural guide tracks 6 are provided at predetermined intervals with a data track 7 being formed between every two adjacent guide tracks 6. Similarly to the conventional optical card, the guide tracks 6 each have such a relatively low reflection factor (dark) so that it is possible to optically detect a difference from the data tracks 7. Further, the recording medium illustrated in the figure has several pits 8 recorded on the data tracks 7.

In FIGS. 1A and 1B, for ease of understanding, the respective irradiation spots of three laser beams La, Lb, Lc (similarly to the above-mentioned, the left and right laser beams are for tracking purposes and the middle laser beam Lc is for read/write purposes) are shown as overlapping the guide and data tracks 6 and 7. As shown, the optical recording medium 10 is characterized in that the intervals between the guide tracks 6 are established in such a manner that the outer edges of two adjacent guide tracks 6 correspond in position to the irradiation spots of the two tracking laser beams La and Lb. Namely, as shown, the positional relationship between the laser beams La, Lb, Lc and the tracks 6, 7 is such that when the middle read/write laser beam Lc is exactly in the middle of the data track 7, the outer edges of the left and right guide tracks 6 are located across the respective centers of the left and right tracking laser beams La and Lb.

For ease of comparison, FIG. 1A shows, with the same magnification as in FIG. 1B, an example arrangement of guide and data tracks 4 and 5 of a conventional-type optical card 1. In this conventional-type optical card 1, as previously mentioned in relation to FIG. 5, the intervals between the guide tracks 4 are established in such a manner that the inner edges of two adjacent guide tracks 4 correspond in position to the irradiation spots of two tracking laser beams La and Lb. Namely, as shown in FIG. 1A, the positional relationship between the laser beams La, Lb, Lc and the tracks 4, 5 is such that when the middle read/write laser beam Lc is exactly in the middle of the data track 5, the inner edges of the left and right guide tracks 4 are located across the respective centers of the left and right tracking laser beams La and Lb. For both the illustrated examples of FIGS. 1A and 1B, the arrangement of the laser beams La, Lb, Lc is the same; that is, the intersection angle, with respect to the tracks, of the row of the laser beams La, Lb, Lc (indicated by imaginary line) is the same for both the examples of FIGS., 1A and 1B.

As will be apparent from comparison between FIGS. 1A and 1B, the optical recording medium (i.e., optical card) 10 of FIG. 1B has narrower track intervals and hence can provide high-density recording.

Both the high-density type optical card 10 of FIG. 1B and the conventional type optical card 10 of FIG. 1A can employ three laser beams La, Lb, Lc of the same positional arrangement. In other words, a same optical system 2 as illustrated in FIG. 4 can be employed for both the optical cards 1 and 10.

Figure 2:
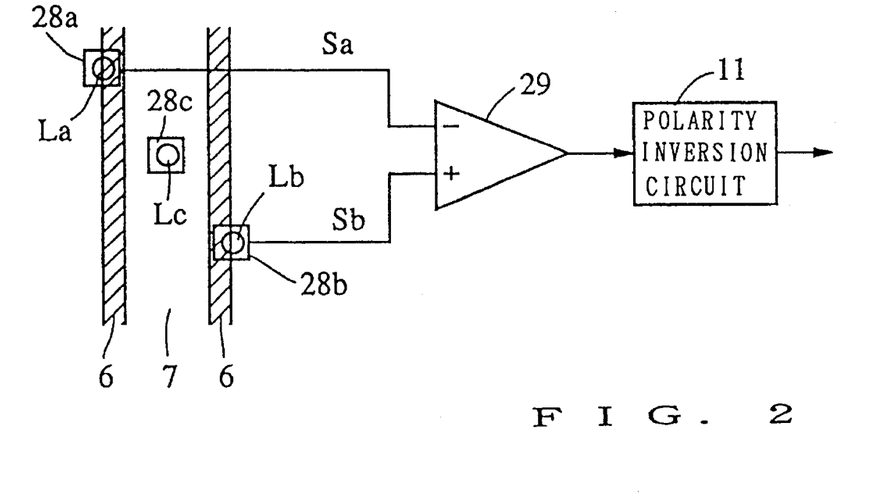
FIG. 2 is a conceptual diagram of a tracking error detecting circuit employed for the high-density type optical recording medium shown in FIG. 1B.

FIG. 2 shows the positional relationship between the three laser beams La, Lb, Lc irradiated onto the tracks 6, 7 of the high-density optical card 10 shown in FIG. 1B and photo detector elements 28a, 28b, 28c that detect respective reflected light components of the laser beams La, Lb, Lc. In a similar manner to FIG. 5, the laser beams La, Lb, Lc, tracks 6, 7 and photo detector elements 28a, 28b, 28c are shown here in overlapped relations for convenience of illustration. A description is given below on the relationship between displacement of the laser beams La, Lb, Lc with respect to the guide tracks 6 and light detection signals with reference to FIG. 2. When the guide tracks 6 are displaced from the illustrated positions to the right relative to the laser beams La, Lb, Lc, the amount of the laser beam Lb applied onto the right guide track 6 increases, while the amount of the laser beam La applied onto the left guide track 6 decreases. In consequence, light energy received by the right photo detector element 28b decreases, while light energy received by the left photo detector element 28a increases. Conversely, when the guide tracks 6 are displaced from the illustrated positions to the left relative to the laser beams La, Lb, Lc, the exactly opposite of the above-mentioned takes place.

From combined consideration of the above description relating to FIG. 2 and the previous description relating to FIG. 5, it will readily be seen that light detection signals derived from the tracking photo detector element 28a and 28b vary in exactly opposite manner between the case where the conventional optical card 1 of FIG. 1A is used and the case where the high-density optical card 10 is used.

More specifically, in the case of FIG. 2 where the high-density optical card 10 is used, if a differential amplifier 29 is designed, similarly to the above-mentioned, to calculate a difference "Sb–Sa" between the tracking beam light detection signals Sa and Sb output from the photo detector elements 28a and 28b, and when, as shown in FIG. 2, the middle read/write laser beam Lc is located exactly in the middle of the data track 7 and the inner edges of the left and right guide tracks 6 are located across the centers of the left and right tracking laser beam spots La and Lb, the output signals Sa and Sb from the left and right photo detector elements 28a and 28b equal and thus the differential amplifier 29 provides a zero output. Once the guide tracks 6 are displaced from the illustrated positions to the right relative to the beam spots La and Lb, Sa>Sb and thus the output signal from the differential amplifier 29 takes a negative value corresponding to the displacement. Conversely, once the guide tracks 6 are displaced from the illustrated positions to the left relative to the beam spots La and Lb, Sa<Sb and thus the output signal from the differential amplifier 29 takes a positive value corresponding to the displacement. It will been seen that the positive or negative value output from the differential amplifier 29, which is representative of a tracking error, is of exactly opposite polarity to that in the case of FIG. 5 where the conventional optical card 1 of FIG. 1A is used.

Accordingly, in the case of FIG. 2, a tracking drive mechanism 18 must be servo-controlled in the transverse direction (in the Y-direction of FIG. 4) in order to eliminate the tracking error, i.e., to make "0" the output from the differential amplifier 29. More specifically, if the output from the differential amplifier 29 is a positive value, the laser beam spots La, Lb, Lc must be moved to the left by the amount corresponding to the positive value, and if the output from the differential amplifier 29 is a negative value, the laser beam spots La, Lb, Lc must be moved to the right by the amount corresponding to the negative value. That is, the tracking control must be performed in the opposite direction to the case of FIG. 5.

To this end, it should be sufficient to provide a polarity inversion circuit 11 on the output side of the differential amplifier 29. The polarity inversion circuit 11, however, need not necessarily be on the output side of the differential amplifier 29 and may be provided at any desired place in the tracking control loop. For example, the inversion circuit 11 may be provided on the input side of the differential amplifier 29, or the output Sa of the photo detector 28a may be coupled to the "+" input of the circuit 11 while the output Sb of the photo detector element 28b may be coupled to the "−" input of the circuit 11. In other words, it suffices to only invert the polarity of the tracking control servo in dependence upon whether the high-density optical card 10 of FIG. 1B is used or the conventional optical card of FIG. 1A is used. In this way, common optical system and tracking control system can compatibly be used for both the high-density optical card 10 and the conventional optical card 1.

Therefore, the read/write optical system 2 shown in FIG. 4 as the prior art can directly be used, without requiring any structural alterations thereto, as an embodiment of a read/write optical system for the optical information recording/reproducing system of the present invention. Further, the control system that performs the above-noted tracking control and information read/write control on the basis of the outputs of the photo detector 28 of the optical system 2 can also be used in the embodiment, by only adding thereto polarity inversion changing/selecting means (corresponding to medium selection switch 12 and polarity inversion circuit 11 of FIG. 3).

Figure 3:
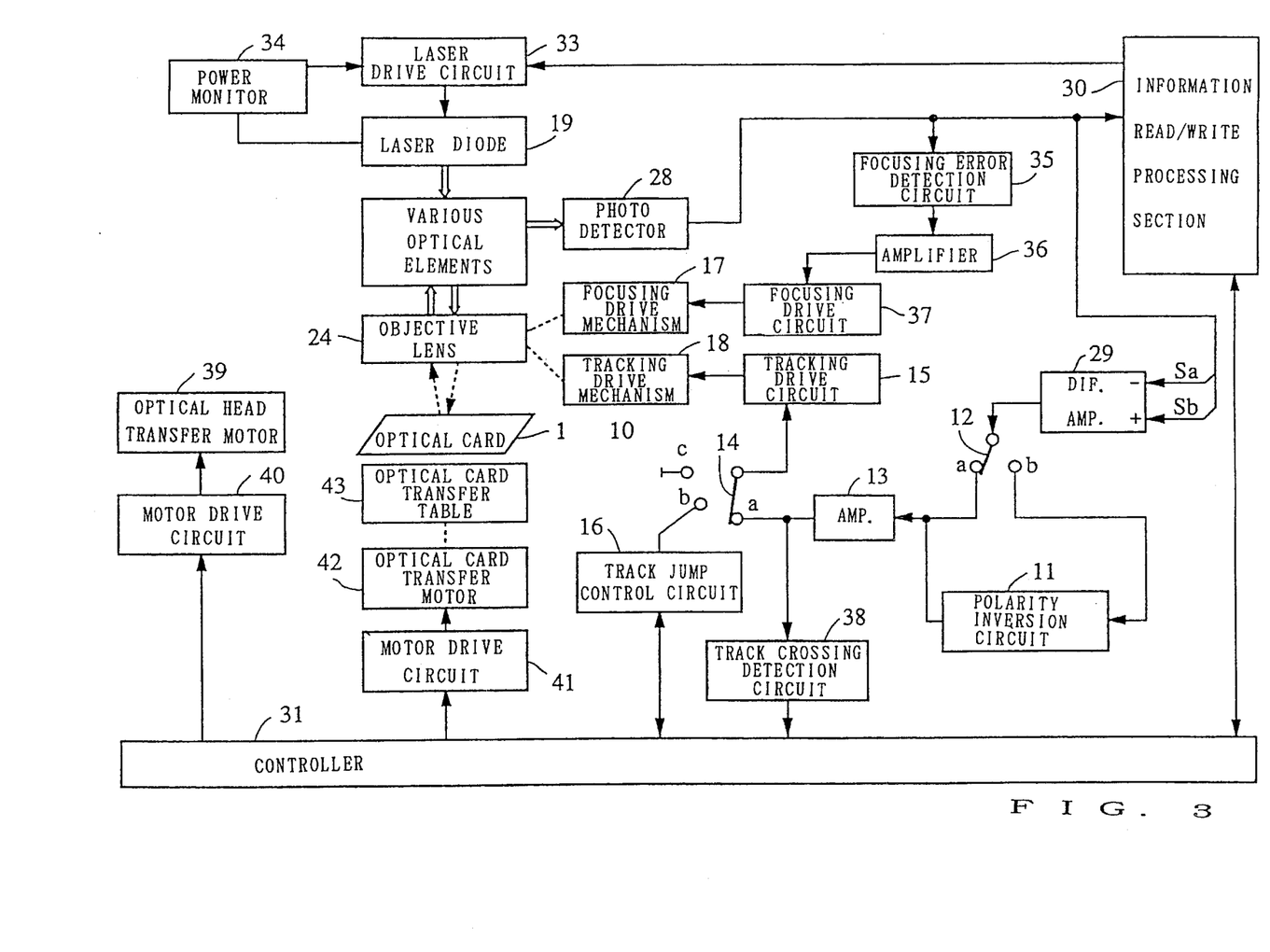
FIG. 3 is a block diagram showing an embodiment of control circuitry in an optical information recording/reproducing system according to the present invention.

FIG. 3 shows an embodiment of a control system for the optical information recording/reproducing system in accordance with the present invention. Most control blocks shown in FIG. 3 may be the same as those in the conventionally known control systems, except for the polarity inversion circuit 11 and medium selection switch 12 that are newly added to the tracking servo control system. The following description contains explanation about the conventionally known structures for quick reference, but it is to be appreciated that all the known structures may be modified as necessary and should not be understood as being constrained only to those explained below.

In FIG. 3, a drive signal for read/write laser is generated from a laser drive circuit 33 in accordance with an information read/write section 33 and is then provided to a laser diode 19. Laser light generated from the laser diode 19 is converted into three laser beams by way of various optical elements of the optical system 2 as shown in FIG. 4, and the laser beams are then irradiated onto an optical card 1 or 10 through an objective lens 24. Reflected light components of the laser beams return to the various optical elements through the objective lens 24 and are then received by the photo detector 28.

On the other hand, light output from the rear surface of the light emitting portion of the laser diode 19 is received by a power monitor photo detector 34 so as to feed light output signal back to the laser drive circuit 33. This feedback loop prevents the laser light output from the laser diode from undesirably varying due to ambient temperature fluctuation etc. so as to keep the laser light output from the laser diode always constant. Thus, the feedback loop performs control such that the light output after having been narrowed by the objective lens 24 is maintained at 0.4 mW during information reproduction and at 13 mW during information recording.

Focusing control will be described below. In order to be able to form pits of predetermined sizes (for example, 2.5 μ in diameter) onto the optical card or reproductively read out recorded pits, it is necessary to accurately focus the laser beams, condensed by the objective lens 24, onto the optical card medium. To this end, using a quadruple photo detector (not shown) as the photo detector 28, a focusing error signal is generated by a focusing error detection circuit 35 on the basis of received-light detection signal obtained by astigmatism; then the focusing drive mechanism 17 is driven via an amplifier 36 and a focusing drive circuit 37 in accordance with the focusing error signal; and then the objective lens 24 is moved vertically with respect to the surface of the optical card medium, so as to control in such a manner that the laser beams are always accurately focused onto the optical card medium surface. This focusing control loop is activated by a focusing control ON signal given from a controller 31.

The tracking control is generally comprised of control for directing the read/write laser beam Lc onto the middle of the data track between the guide tracks for information recording/reproduction, and near-jump and far-jump control.

The tracking control is performed by a tracking servo control loop which is comprised of the tracking photo detector elements 28a and 28b of the photo detector 28, differential amplifier 29, polarity inversion circuit 11, amplifier 13, control changeover switch 14, tracking drive circuit 15 and tracking drive mechanism 18. In this example, the control changeover switch 14 is connected to a contact "a" under the control of the controller 14 in such a manner that the output of the amplifier 13 is coupled to the tracking drive circuit 15 by way of the contact "a".

Of output signals from the photo detector 28, light detection signals Sa, Sb from the tracking photo detector elements 28a, 28b are provided to the "−" and "+" inputs, respectively, of the tracking error detecting differential amplifier 19. The medium selection switch 12 is provided on the output side of the differential amplifier 29, and for selecting the conventional optical card 1, the switch 12 is connected to a contact "a" so as to couple the output of the differential amplifier 29 directly to the amplifier 13. On the other hand, for selecting the high-density optical card 10, the medium selection switch 12 is connected to a contact "b" so as to couple the output of the differential amplifier 29 to the polarity inversion circuit 11 to thereby apply polarity-inverted signal to the amplifier 13. The switching operation of the medium selection switch 12 may be manually performed depending upon the type of the optical card medium employed, or performed automatically in response to automatic detection of the type of the optical card medium inserted.

The tracking drive circuit 15 drives the tracking drive mechanism 18 in response to the tracking error signal given from the amplifier 13 via the contact "a" of the control changeover switch 14, so that the objective lens 24 is slightly moved positively or negatively across the guide tracks of the optical card medium (in the Y-direction). In this manner, the tracking drive circuit 15 performs control such that the read/write laser beam spot Lc is positioned in the middle of the data track between the guide tracks.

In the case where the conventional optical card 1 is used, the output from the differential amplifier 29 is provided directly to the amplifier 13 without its polarity being inverted. Accordingly, in the same manner as described earlier with reference to FIG. 5, once the guide tracks 4 are displaced relatively leftward from the illustrated positions, the output of the differential amplifier 29 takes a negative value corresponding to the displacement, and thus the laser beams La, Lb, Lc are slightly moved relatively leftward by means of the tracking drive mechanism 18 so as to remove this tracking error. Conversely, once the guide tracks 4 are displaced relatively rightward from the illustrated position, the output of the differential amplifier 29 takes a positive value corresponding to the displacement, and thus the laser beams La, Lb, Lc are slightly moved relatively rightward by means of the tracking drive mechanism 18 so as to remove this tracking error.

On the other hand, in the case where the high-density optical card 10 is used, the output from the differential amplifier 29 is provided to the amplifier 13 with its polarity inverted. Accordingly, in the same manner as described earlier with reference to FIG. 2, once the guide tracks 6 are displaced relatively leftward from the illustrated positions, the output of the differential amplifier 29 takes a positive value corresponding to the displacement, but, similarly to the conventional optical card 1, the tracking error signal provided to the tracking drive circuit 15 via the amplifier 13 takes a negative value corresponding to the displacement. Thus, the laser beams La, Lb, Lc are slightly moved relatively leftward by means of the tracking drive mechanism 18 so as to remove this tracking error. Conversely, once the guide tracks 6 are displaced relatively rightward from the illustrated positions, the output of the differential amplifier 29 takes a negative value corresponding to the displacement, but, similarly to the conventional optical card 1, the tracking error signal provided to the tracking drive circuit 15 via the amplifier 13 takes a positive value corresponding to the displacement. Thus, the laser beams La, Lb, Lc are slightly moved relatively rightward by means of the tracking drive mechanism 18 so as to remove this tracking error.

As apparent from the above-mentioned, similar tracking servo control can be accurately performed for the two types of optical cards 1 and 10. Therefore, for the two types of optical cards 1 and 10, it is allowed to use the exactly same recording/reproducing device to compatibly record and reproduce optical information with utmost ease.

Now, an explanation will be made about the near-jump control, i.e., control for moving the laser beam spots over one or several tracks in the positive or negative direction. In this case, the control changeover switch 14 is connected to the contact "b" in compliance with a near-jump command given from the controller 31. In response to this, the above-mentioned tracking servo loop is turned OFF, and a track jump control circuit 16 is connected to the tracking drive circuit 15 by way of the contact "b" of the control changeover switch 14. A drive command signal is output from the track jump control circuit 16 so as to drive the tracking drive mechanism 18 in correspondence to a direction in which the laser beam spots are to be moved. A track crossing detection circuit 38 detects when the tracking error signal given from the amplifier 13 has exceeded a preset threshold level to thereby determine that a predetermined number of the guide tracks has been crossed. The near-jump control is terminated on the basis of such detection. Upon completion of the near-jump control, the control changeover switch 14 is connected to the contact "a" so that the tracking servo control loop is turned ON.

Next, an explanation will be made about the far-jump control, i.e., control for moving the laser beam spots to relatively remote tracks. This far-jump control is directed to fast moving the entire optical system 2 (optical head unit) in the Y direction by means of an optical head transfer motor 39. In this case, the control changeover switch 14 is connected to a contact "c" in compliance with a far-jump command given from the controller 31. This turns OFF the tracking servo loop. Once a drive command is given from the controller 31 to the motor drive circuit 40 to drive the optical head transfer motor 39 and thus the entire optical system 2 (optical head unit) is fast moved in the Y direction to a predetermined target position, the motor drive operation is stopped to terminate the far-jump control. Concurrently with termination of the far-jump control, the control changeover switch 14 is switched to the contact "a", upon which the tracking servo control loop is turned ON.

Now, to describe an optical card transfer drive section of the embodiment, this section is capable of reciprocatingly transferring the optical card 1 or 10 for recording onto or reproduction from the card 1 or 10, and it further controls the card transfer to constant speed during the recording/reproduction operation. To this end, the optical card transfer drive section is comprised of a motor drive circuit 41 and an optical card transfer motor 42 and an optical card transfer table 43 for transferring the optical card in the X direction (direction parallel to the tracks). The transfer control operation of the drive section is controlled by the controller 31 to repeat the transfer operations (comprising acceleration, constant speed transfer, speed reduction and stop operations) for intended information recording or reproduction.

According to the present invention as has been described so far, it is possible to effectively achieve densification of an optical recording medium by minimizing intervals between its guide tracks with respect to the row of tracking laser beam spots. Further, by only requiring simple alterations to selectively invert the polarity of feedback signal in the tracking servo control system, it is possible to provide a compatible optical information recording/reproducing system that is applicable to both the above-described high-density optical recording medium and the conventional optical recording medium, and hence is very economical.

What is claimed is:

1. An optical information recording/reproducing system which performs tracking and read/write of information on an optical recording medium by irradiation thereonto of two tracking laser beams and a read/write laser beam positioned between the tracking laser beams, said two tracking laser beams being irradiated at a predetermined angle relative to the read/write laser beam, said recording/reproducing system comprising:

selection means for selectively using either of optical recording media defined in items (a) and (b) below:

(a) a first-type optical recording medium comprising data tracks for optically recording thereon desired information and optical guide tracks formed on both sides of each of said data tracks, each of said data tracks being formed between said guide tracks that are spaced apart from each other at first predetermined intervals such that inner edges of two adjacent said guide tracks correspond in position to irradiated spots of said two tracking laser beams irradiated at the predetermined angle; and (b) a second-type optical recording medium comprising data tracks for optically recording thereon desired information and optical guide tracks formed on both sides of each of said data tracks, each of said data tracks being formed between said guide tracks that are spaced apart from each other at second predetermined intervals such that outer edges of said guide tracks correspond in position to irradiated spots of said two tracking laser beams irradiated at the predetermined angle; and tracking servo polarity changing means for, depending upon which of the first- and second-type optical recording media is used, changing a polarity of a tracking servo that performs tracking control of the irradiated spots of the laser beams on the basis of detection signals of respective reflection of said tracking laser beams from the recording medium used.

2. A tracking control device capable of selectively using either a first type recording medium or a second type recording medium, said first type recording medium being a conventional type medium having guide tracks spaced apart from each other by relatively large intervals, said second type recording medium being a high-density type medium having guide tracks spaced apart from each other by relatively small intervals, said control device comprising:

optical means for irradiating two tracking laser beams at a predetermined angle onto two guide tracks of one of said first type and second type recording medium that is used in said device and receiving respective reflection of the tracking laser beams to provide corresponding electrical light detection signals;

a servo control loop including calculation means for calculating a difference between the light detection signals, said servo control loop, using an output from said calculation means as a feedback signal representative of a tracking error, servo-controlling the irradiated spots of the laser beams so that the irradiated spots are at predetermined angular positions with respect to said guide tracks;

polarity inversion means for inverting a polarity of the light detection signals in said servo control loop to provide inverted signals prior to calculating the difference; and     selection means for selecting between, for use in said servo control loop, the inverted signals from said polarity inversion means and the non-inverted signals, depending on which of said first type and second type recording medium is used.

3. A high density optical recording medium on which tracking and read/write of information are performed by irradiation thereonto of two tracking laser beams and a read/write laser beam positioned at a predetermined angle between the tracking laser beams, said two tracking laser beams being usable to irradiate a conventional optical medium, said conventional optical medium having data tracks and guide tracks that are set at intervals between the data tracks, wherein the predetermined angle is set so that the two tracking laser beams irradiate spots on inner edges of the guide tracks on the conventional optical medium, said optical recording medium comprising:

data tracks for optically recording thereon desired information and optically detectable guide tracks formed on both sides of each of said data tracks, each of said data tracks being formed between said guide tracks that are spaced apart from each other at predetermined intervals, said predetermined intervals being smaller than the intervals on the conventional optical medium and set such that outer edges of two adjacent said guide tracks correspond in position to the irradiated spots of said two tracking laser beams.

4. The system according to claim 1, wherein the predetermined angle is fixed to illuminate a spot at a predetermined distance away from the center of the data track.

5. The system according to claim 1, wherein the system uses only three laser beams.

6. The system according to claim 1, wherein the optical medium are optical cards.

7. The control device according to claim 2, wherein the predetermined angle is fixed to illuminate a spot at a predetermined distance away from the center of the data track.

8. The control device according to claim 2, wherein the control device uses only three laser beams.

9. The control device according to claim 2, wherein the optical medium are optical cards.

10. A tracking control device for use when recording/reproducing data on either conventional or high density optical mediums, wherein the conventional optical medium includes data tracks and guide tracks which are placed between the data tracks at a predetermined interval, and wherein the high density optical medium includes data tracks and guide tracks which are placed between the data tracks at a second predetermined interval that is smaller than the predetermined interval used for the guide tracks on the conventional optical medium, the control device comprising:

an optical generation circuit that generates and projects a recording/reproducing laser beam and two tracking laser beams at a predetermined angle relative to the recording/reproducing laser beam, wherein the two tracking laser beams are irradiated on two guide tracks on either side of a data track of either the conventional optical medium or the high density optical medium, wherein the two tracking laser beams projected at the predetermined angle contact the inner edges of the guide tracks on the conventional optical medium or contact the outer edges of the guide tracks on the high density optical medium;

a servo control loop that detects a difference between signals representing reflections of the two irradiated tracking laser beams, wherein the servo control loop uses the detected difference to determine a tracking error signal, and wherein the servo control loop utilizes the tracking error signal to maintain the two tracking laser beams on the guide tracks;

a polarity inversion circuit that inverts a polarity of the signals in said servo control loop prior to detecting the difference between the signals; and     a selection circuit that passes and selects between the non-inverted signals and the inverted signals from the polarity inversion circuit, depending on whether the conventional optical medium or the high density optical medium is used.

11. The control device according to claim 10, wherein the predetermined angle is fixed to illuminate a spot at a predetermined distance away from the center of the data track.

12. The control device according to claim 10, wherein the control device uses only three laser beams.

13. The control device according to claim 10, wherein the optical mediums are optical cards.

\* \* \* \* \*